US007321382B2

(12) United States Patent
Okajima et al.

(10) Patent No.: US 7,321,382 B2
(45) **Date of Patent: *Jan. 22, 2008**

(54) VIRTUAL COMMUNICATION DEVICE CONFIGURING METHOD AND APPARATUS

(75) Inventors: Ichiro Okajima, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 650 days.

This patent is subject to a terminal disclaimer.

(21) Appl. No.: 10/879,127

(22) Filed: Jun. 30, 2004

(65) Prior Publication Data

US 2005/0027847 A1 Feb. 3, 2005

Related U.S. Application Data

(63) Continuation-in-part of application No. 09/745,546, filed on Dec. 26, 2000, now Pat. No. 7,006,121.

(30) Foreign Application Priority Data

Dec. 28, 1999 (JP) ................................ 11-375794

(51) Int. Cl.
*H04N 7/14* (2006.01)

(52) U.S. Cl. ................................ 348/14.01; 348/14.11; 348/14.03; 370/258

(58) Field of Classification Search .. 348/14.01–14.04, 348/14.07–14.13; 345/753; 709/201–204; 370/260–263, 252; 379/93.21, 202.01, 265.09
See application file for complete search history.

(56) References Cited

U.S. PATENT DOCUMENTS 5,689,553 A 11/1997 Ahuja et al.

(Continued)

FOREIGN PATENT DOCUMENTS

EP 0 942 554 9/1999

(Continued)

OTHER PUBLICATIONS

R. Mohan, et al., IEEE Global Telecommunications Conference, vol. 4 pp. 2015-2021, XP-000951336, "Content Adaptation Framework: Bringing the Internet to Information Applicances," Dec. 5, 1999.

*Primary Examiner*—Melur Ramakrishnaiah
(74) *Attorney, Agent, or Firm*—Oblon, Spivak, McClelland, Maier & Neustadt, P.C.

(57) ABSTRACT

An apparatus is adapted to configure a virtual communication device that includes communication devices accessible to the apparatus. A signal interface receives from a calling communication device information data including first and second content parts, and an information separating unit separates the first and second content parts of the information data. A DMF unit identifies communication attributes of the communication devices accessible thereto and identifies the communication devices capable of processing information corresponding to at least one of the first and second content parts. A virtual terminal interface sends information corresponding to the first content part to a first communication device identified as being capable of processing the first content part and information corresponding to the second content part to a second communication device capable of processing the information of the second content part, to thereby form the virtual communication device by at least the first and second communication devices.

20 Claims, 9 Drawing Sheets

U.S. PATENT DOCUMENTS

| | | | | |
|---|---|---|---|---|
| 5,737,321 | A | | 4/1998 | Takahashi |
| 5,887,136 | A | * | 3/1999 | Yasuda et al. .............. 709/204 |
| 5,946,386 | A | | 8/1999 | Rogers et al. |
| 5,991,795 | A | | 11/1999 | Howard et al. |
| 6,020,915 | A | | 2/2000 | Bruno et al. |
| 6,115,372 | A | | 9/2000 | Dinha |
| 6,356,533 | B1 | | 3/2002 | Bruno et al. |

FOREIGN PATENT DOCUMENTS

| | | |
|---|---|---|
| WO | WO 97/46073 | 12/1997 |

* cited by examiner

USER A
COMMUNICATION DEVICE
$20_1$
$20_2$
$20_N$
22
23
24
COMMUNICATION PROTOCOL UNIT
$27_1$
$27_2$
$27_N$
INFO CODING SCHEME CONVERTING UNIT
$28_1$
$28_2$
$28_N$
INFO SEPARATING UNIT
32
INFO COMBINING UNIT
30
DMF UNIT
36
COMMUNI-CATION PROTOCOL UNIT
34
25
37
$38_1$
$38_2$
$38_M$
USER B

USER A
USER B
COMMUNI-CATION DEVICE
COMMUNI-CATION PROTOCOL UNIT
INFO CODING SCHEME CONVERTING UNIT
INFO SEPARATING UNIT
INFO COMBINING UNIT
DMF UNIT
62
63
64
65
70
71
72
73
78

C
80₃
82
80₄
D
IMT-2000
84
D
80₇
4TH- GENERATION MOBILE
COMMUNICATION NETWORK
88
DMF
80₆
D
86
VTF
Blue tooth
D
80₉
D
80₈
D
80₁
80₂ WIRED IP NETWORK
D
81
WIRELESS LAN
D
80₅
83

VIRTUAL COMMUNICATION DEVICE CONFIGURING METHOD AND APPARATUS

This application is a Continuation-In-Part Application of a U.S. patent application Ser. No. 09/745,546 filed Dec. 26, 2000 now U.S. Pat. No. 7,006,121.

This application claims the benefit of a Japanese Patent Application No. 11-375794 filed Dec. 28, 1999, in the Japanese Patent Office, the disclosure of which is hereby incorporated by reference.

BACKGROUND OF THE INVENTION

1. Field of the Invention

The present invention generally relates to virtual communication device configuring methods and apparatuses, and more particularly to virtual communication device configuring method and apparatus which forms a virtual communication device by combining a plurality of communication devices.

2. Description of the Related Art

FIG. 1 is a diagram showing an example of a conventional videophone communication system. A videophone 10 owned by a user A and a videophone 12 owned by a user B are mutually connected via a network 14 such as an Integrated Services Digital Network (ISDN). Video information and voice information are transferred between the videophone terminals 10 and 12 via the network 14. The videophone terminals 10 and 12 communicate with each other using video and voice compression coding rule and protocol for ISDN.

Conventionally, videophone communications can be made only when both the users A and B have the videophone terminals 10 and 12 using the same video and voice compression coding rule and protocol.

Nowadays, users have various kinds of communication devices such as cellular phones, Personal Digital Assistants (PDAs), and personal computers (PCs). When the users wish to use a new communication service such as videophone communications, the users are required to prepare a new communication device such as a videophone terminal.

SUMMARY OF THE INVENTION

Accordingly, it is a general object of the present invention to provide a novel and useful virtual communication device configuring method and apparatus, in which the problems described above are suppressed.

Another and more specific object of the present invention is to provide a virtual communication device configuring method and apparatus, which combines a plurality of communication devices so as to form a virtual communication device capable of handling various types of communications regardless of changes in the plurality of communication devices.

Still another object of the present invention is to provide an apparatus for configuring a virtual communication device that includes a plurality of communication devices accessible to the apparatus, the plurality of communication devices having variable communication attributes and/or being variable in number, the apparatus comprising a signal interface configured to receive information data from a calling communication device, the information data including at least a first content part and a second content part, the second content part containing information of a different media content than the first content part; an information separating unit configured to separate the first and second content parts of the information data; a device management function unit configured to identify the communication attributes of the plurality of communication devices accessible thereto and to identify which of the plurality of communication devices are capable of processing information corresponding to at least one of the first and second content parts, the communication attributes including capabilities or functionalities of the plurality of communication devices accessible to the device management function unit; and a virtual terminal interface configured to send information corresponding to the first content part to a first communication device identified by the device management function unit as being capable of processing the information of the first content part, and to send information corresponding to the second content part to a second communication device identified by the device management function unit as being capable of processing the information of the second content part, to thereby form the virtual communication device by at least the first and second communication devices. According to the apparatus of the present invention, it is possible to combine a plurality of communication devices so as to form a virtual communication device capable of handling various types of communications regardless of changes in the plurality of communication devices.

A further object of the present invention is to provide an apparatus for configuring a virtual communication device that includes a plurality of communication devices accessible to the apparatus, the plurality of communication devices having variable communication attributes and/or being variable in number, the apparatus comprising signal interface means for receiving information data from a calling communication device, the information data including at least a first content part and a second content part, the second content part containing information of a different media content than the first content part; information separating means for separating the first and second content parts of the information data; management means for identifying the communication attributes of the plurality of communication devices accessible thereto and for identifying which of the plurality of communication devices are capable of processing information corresponding to at least one of the first and second content parts, the communication attributes including capabilities or functionalities of the plurality of communication devices accessible to the management means; and virtual terminal interface means for sending information corresponding to the first content part to a first communication device identified by the management means as being capable of processing the information of the first content part, and for sending information corresponding to the second content part to a second communication device identified by the management means as being capable of processing the information of the second content part, to thereby form the virtual communication device by at least the first and second communication devices. According to the apparatus of the present invention, it is possible to combine a plurality of communication devices so as to form a virtual communication device capable of handling various types of communications regardless of changes in the plurality of communication devices.

Another object of the present invention is to provide an apparatus for configuring a virtual communication device that includes a plurality of communication devices accessible to the apparatus, the plurality of communication devices having variable communication attributes and/or being variable in number, the apparatus comprising a virtual terminal interface configured to receive information corresponding to a first content part from a first communication device of the plurality of communication devices and information corresponding to a second content part from a second communication device of the plurality of communication devices, the second content part containing information of a different media content than the first content part; a device management function unit configured to identify the communication attributes of the plurality of communication devices accessible thereto, and to identify the first communication device as being capable of processing the information corresponding to the first content part and the second communication device as being capable of processing the information corresponding to the second content part, the communication attributes including capabilities or functionalities of the plurality of communication devices accessible to the device management function unit; an information combing unit configured to combine the information corresponding to the first content part and the information corresponding to the second content part into information data which includes the first and second content parts; and a signal interface configured to send the information data to a calling communication device. According to the apparatus of the present invention, it is possible to combine a plurality of communication devices so as to form a virtual communication device capable of handling various types of communications regardless of changes in the plurality of communication devices.

Still another object of the present invention is to provide an apparatus for configuring a virtual communication device that includes a plurality of communication devices accessible to the apparatus, the plurality of communication devices having variable communication attributes and/or being variable in number, the apparatus comprising virtual terminal interface means for receiving information corresponding to a first content part from a first communication device of the plurality of communication devices and information corresponding to a second content part from a second communication device of the plurality of communication devices, the second content part containing information of a different media content than the first content part; management means for identifying the communication attributes of the plurality of communication devices accessible thereto, and for identifying the first communication device as being capable of processing the information corresponding to the first content part and the second communication device as being capable of processing the information corresponding to the second content part, the communication attributes including capabilities or functionalities of the plurality of communication devices accessible to the management means; information combing means for combining the information corresponding to the first content part and the information corresponding to the second content part into information data which includes the first and second content parts; and signal interface means for sending the information data to a calling communication device. According to the apparatus of the present invention, it is possible to combine a plurality of communication devices so as to form a virtual communication device capable of handling various types of communications regardless of changes in the plurality of communication devices.

A further object of the present invention is to provide a method of configuring a virtual communication device that includes a plurality of communication devices having variable communication attributes and/or being variable in number, the method comprising the steps of (a) receiving information data from a calling communication device, the information data including at least a first content part and a second content part, the second content part containing information of a different media content than the first content part; (b) separating the first and second content parts of the information data; (c) identifying the communication attributes of the plurality of communication devices that are accessible and identifying which of the plurality of communication devices are capable of processing information corresponding to at least one of the first and second content parts, the communication attributes including capabilities or functionalities of the plurality of communication devices that are accessible; and (d) sending information corresponding to the first content part to a first communication device identified by the step (c) as being capable of processing the information of the first content part, and sending information corresponding to the second content part to a second communication device identified by the step (c) as being capable of processing the information of the second content part, to thereby form the virtual communication device by at least the first and second communication devices. According to the method of the present invention, it is possible to combine a plurality of communication devices so as to form a virtual communication device capable of handling various types of communications regardless of changes in the plurality of communication devices.

Another object of the present invention is to provide a method of configuring a virtual communication device that includes a plurality of communication devices having variable communication attributes and/or being variable in number, the method comprising the steps of (a) receiving information corresponding to a first content part from a first communication device of the plurality of communication devices and information corresponding to a second content part from a second communication device of the plurality of communication devices, the second content part containing information of a different media content than the first content part; (b) identifying the communication attributes of the plurality of communication devices that are accessible, and identifying the first communication device as being capable of processing the information corresponding to the first content part and the second communication device as being capable of processing the information corresponding to the second content part, the communication attributes including capabilities or functionalities of the plurality of communication devices that are accessible; (c) combining the information corresponding to the first content part and the information corresponding to the second content part into information data which includes the first and second content parts; and (d) sending the information data to a calling communication device. According to the method of the present invention, it is possible to combine a plurality of communication devices so as to form a virtual communication device capable of handling various types of communications regardless of changes in the plurality of communication devices.

Other objects and further features of the present invention will be apparent from the following detailed description when read in conjunction with the accompanying drawings.

DESCRIPTION OF THE PREFERRED EMBODIMENTS

Figure 1:
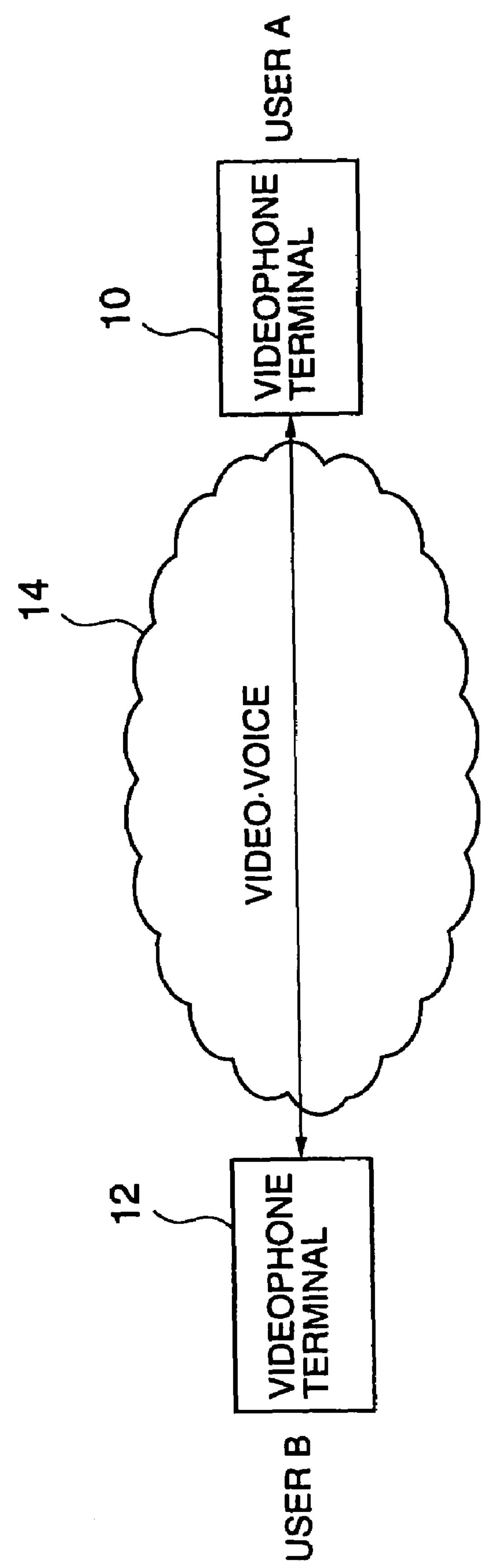
FIG. 1 is a diagram showing an example of a conventional videophone communication system.
Figure 2:
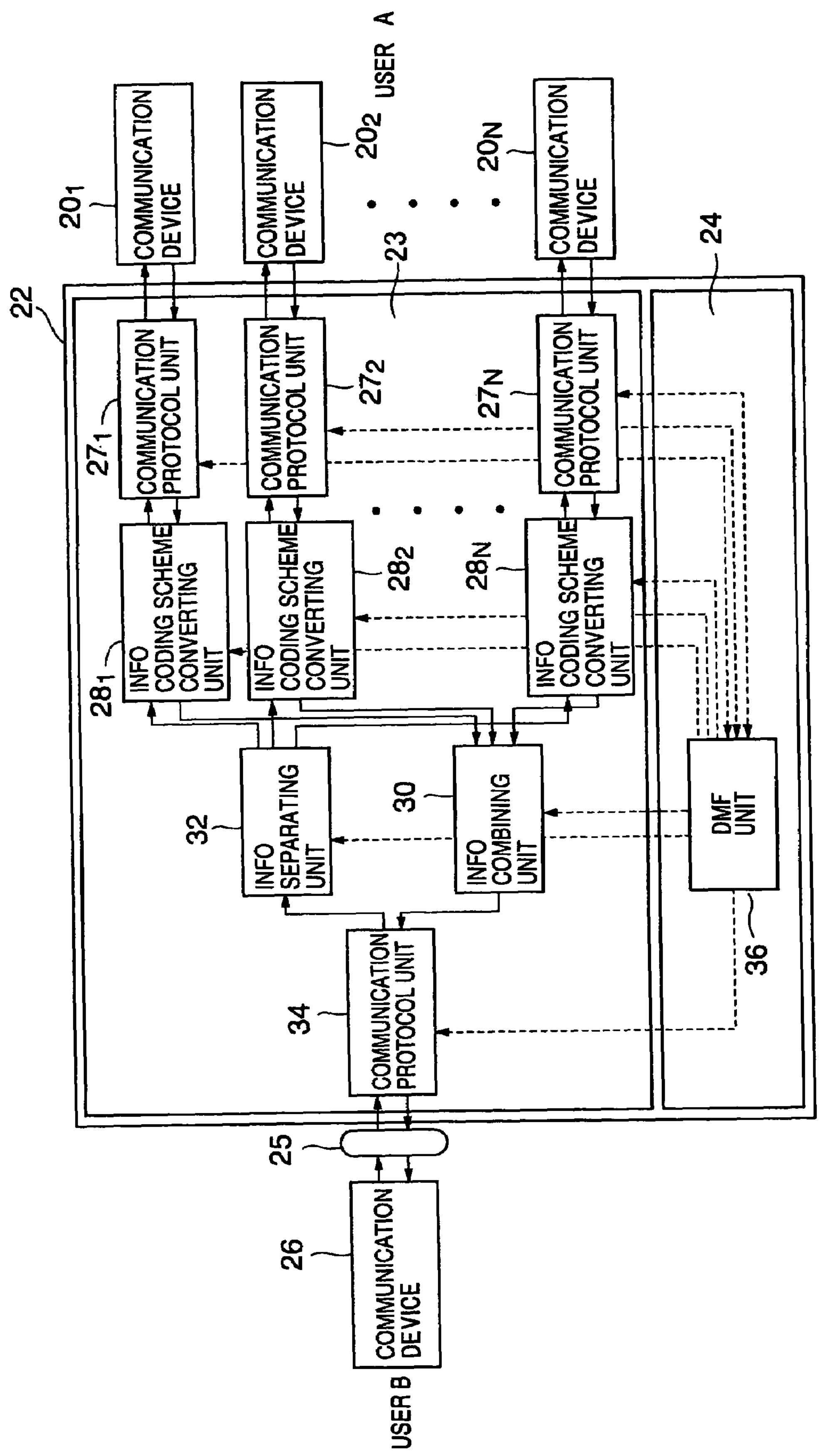
FIG. 2 is a block diagram showing a communication system including a first embodiment of a virtual communication device configuring apparatus according to the present invention.

FIG. 2 is a block diagram showing a communication system including a first embodiment of a virtual communication device configuring apparatus according to the present invention.

In FIG. 2, communication devices $\mathbf{20}_1$ through $\mathbf{20}_N$ which are usable by a user A are connected to a virtual communication device configuring apparatus (or virtual terminal configuring apparatus) 22. The virtual communication device configuring apparatus 22 is connected, via a network 25, to a communication device 26 which is usable by a user B. The communication devices $\mathbf{20}_1$ through $\mathbf{20}_N$ are capable of inputting and outputting various kinds of information data, such as voice, image, character and numerical value information. The communication device 26 is also capable of comprehensively inputting and outputting the various kinds of information data processed by the communication devices $\mathbf{20}_1$ through $\mathbf{20}_N$.

The virtual communication device configuring apparatus 22 includes a virtual communication device function unit (or virtual terminal function unit) 23 and a device management function unit 24. The virtual communication device function unit 23 includes communication protocol units $\mathbf{27}_1$ through $\mathbf{27}_N$ to which the communication devices $\mathbf{20}_1$ through $\mathbf{20}_N$ are respectively connected, information coding scheme converting units $\mathbf{28}_1$ through $\mathbf{28}_N$ which are respectively connected to the communication protocol units $\mathbf{27}_1$ through $\mathbf{27}_N$, an information combining unit 30, an information separating unit 32, and a communication protocol unit 34. Thus, two-way communications can be made between the communication devices $\mathbf{20}_1$ through $\mathbf{20}_N$ and the corresponding communication protocol units $\mathbf{27}_1$ through $\mathbf{27}_N$. The communication protocol units $\mathbf{27}_1$ through $\mathbf{27}_N$ form a virtual terminal interface, and the communication protocol unit 34 forms a signal interface.

The communication device 26 is connected, via the network 25, to the communication protocol unit 34 of the virtual communication device function unit 23. The communication protocol unit 34 employs a communication protocol of the communication device 26, and makes two-way communications with the communication device 26.

The information coding scheme converting units $\mathbf{28}_1$ through $\mathbf{28}_N$ respectively convert the information coding scheme of the communication protocol unit 34 into the information coding schemes of the communication protocol units $\mathbf{27}_1$ through $\mathbf{27}_N$, and convert the information coding schemes of the communication protocol units $\mathbf{27}_1$ through $\mathbf{27}_N$ into the information coding scheme of the communication protocol unit 34. For example, if the communication protocol unit 34 employs the MPEG1 as the information coding scheme for dynamic images and the communication protocol unit $\mathbf{27}_1$ employs the MPEG4 as the information coding scheme for dynamic images when making a communication by the virtual communication device, the information coding scheme converting unit $\mathbf{28}_1$ carries out a conversion from MPEG1 to MPEG4 and vice versa. If the information coding scheme that is employed includes information obtained by data compression, the corresponding information coding scheme converting unit carries out necessary data expansion and data compression when converting the information coding scheme. In other words, the data expansion and the data compression are a part of the process associated with the conversion of the information coding scheme.

The information coding scheme converting units $\mathbf{28}_1$ through $\mathbf{28}_N$ have a filtering function. The filtering function is used when there is a large difference between a bit rate of channels of the network 25 to which the communication protocol unit 34 is connected and a bit rate of channels of a network to which the communication protocol units $\mathbf{27}_1$ through $\mathbf{27}_N$ are connected, so as to extract from the coded information only information having a comparatively high priority. By use of the filtering function, it is possible to reduce the amount of information processed by the information coding scheme which is employed by the channel having the comparatively high bit rate to an optimum amount of information to be processed by the information coding scheme which is employed by the channel having the comparatively low bit rate.

Information data, that is, items of information output from the information coding scheme converting units $\mathbf{28}_1$ through $\mathbf{28}_N$ are supplied to the information combining unit 30. The information combining unit 30 combines the information data which are supplied from the information coding scheme converting units $\mathbf{28}_1$ through $\mathbf{28}_N$ and have been converted to employ the same information coding scheme into a single combined or multiplexed information data. The combined or multiplexed information data from the information combining unit 30 is supplied to the communication protocol unit 34 which sends the combined or multiplexed information data to the communication device 26 via the network 25.

On the other hand, the communication protocol unit 34 supplies combined or multiplexed information data received from the communication device 26 to the information separating unit 32. Various kinds of information data, such as voice, image, character and numerical value information are combined or multiplexed in the combined or multiplexed information data. The information separating unit 32 separates the combined or multiplexed information data into the kinds of information data, and supplies the kinds of information data to the corresponding information coding scheme converting units $\mathbf{28}_1$ through $\mathbf{28}_N$. The information coding scheme converting units $\mathbf{28}_1$ through $\mathbf{28}_N$ convert the information data employing the information coding scheme employed by the communication protocol unit 34 into information data employing the information coding schemes employed by the corresponding communication protocol units $27_1$ through $27_N$, and supply the converted information data to the corresponding communication protocol units $27_1$ through $27_N$.

The device management function unit 24 of the virtual communication device configuring apparatus 22 includes a device management function unit 36. Management information indicating communication attributes of the communication devices $20_1$ through $20_N$ and 27 which are respectively connected to the communication protocol units $27_1$ through $27_N$ and 34, such as the capabilities and functionalities which include the kind of information data processed, the functions, the human interface capabilities, the communication capabilities and the communication status (indicating whether or not to permit a requested communication), is notified from the communication protocol units $27_1$ through $27_N$ and 34 of the virtual communication device function unit 23 to the device management function unit 36. The device management function unit 36 supplies control signals to and controls operations of the communication protocol units $27_1$ through $27_N$ and 34, the information coding scheme converting units $28_1$ through $28_N$, the information combining unit 30 and the information separating unit 32, depending on the kinds of information data input and output by the communication devices $20_1$ through $20_N$ and 27.

When the communication device 26 of the user B initiates a call addressed to any of the communication devices $20_1$ through $20_N$ of the user A, the device management function unit 24 compares the capabilities of the communicatable ones of the communication devices $20_1$ through $20_N$ of the user A, based on the human interface capability and the communication capability required by the communication device 26, and judges which of the communication devices $20_1$ through $20_N$ can accept the call from the communication device 26. Of the communication devices $20_1$ through $20_N$ usable by the user A, selected ones of the communication devices which can accept the call are virtually combined (or integrated) into a single virtual communication device by the virtual communication device function unit 23. Hence, a communication can be made between this virtual communication device and the communication device 26 usable by the user B.

Figure 3:
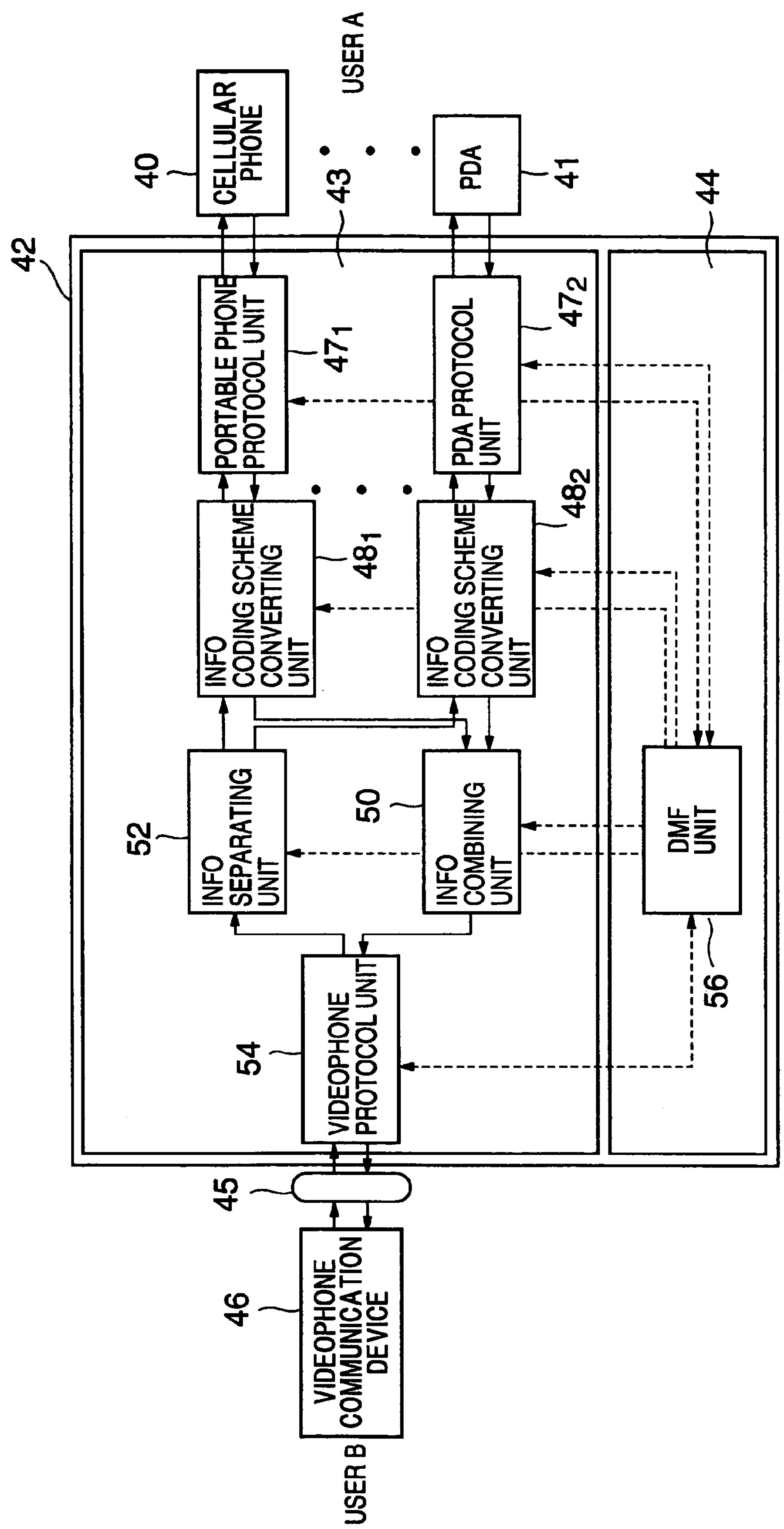
FIG. 3 is a block diagram showing a communication system including a second embodiment of the virtual communication device configuring apparatus according to the present invention.

FIG. 3 is a block diagram showing a communication system including a second embodiment of the virtual communication device configuring apparatus according to the present invention.

In FIG. 3, a cellular phone 40, a PDA 41 and the like which are usable by the user A are connected to a virtual communication device configuring apparatus (or virtual terminal configuring apparatus) 42. The virtual communication device configuring apparatus 42 is connected, via a network 45, to a videophone communication device 46 which is usable by the user B.

The virtual communication device configuring apparatus 42 includes a virtual communication device function unit (or virtual terminal function unit) 43 and a device management function unit 44. The cellular phone 40 and the PDA 41 are respectively connected to communication protocol units $47_1$ and $47_2$ of the virtual communication device function unit 43. Two-way communications can be made between the cellular phone 40 and the communication protocol unit $47_1$, and between the PDA 41 and the communication protocol unit $47_2$. The videophone communication device 46 is connected, via a network 45, to a communication protocol unit 54 of the virtual communication device function unit 43. Two-way communications can be made between the videophone communication device 46 and the communication protocol unit 54. The communication protocol units $47_1$ and $47_2$ form a virtual terminal interface, and the communication protocol unit 54 forms a signal interface.

The communication protocol units $47_1$ and $47_2$ are respectively connected to information coding scheme converting units $48_1$ and $48_2$ of the virtual communication device function unit 43. The information coding scheme converting unit $48_1$ converts voice information data of the information coding scheme employed by the cellular phone 40 and supplied from the communication protocol unit $47_1$ into voice information data of the information coding scheme employed by the videophone communication device 46, and supplies the converted voice information data to an information combining unit 50 of the virtual communication device function unit 43. The information coding scheme converting unit $48_2$ converts video information of the information coding scheme employed by the PDA 41 and supplied from the communication protocol unit $47_2$ into video information of the information coding scheme employed by the videophone communication device 46, and supplies the converted voice information data to the information combining unit 50. For example, in a case where the image information data supplied from the PDA 41 relates to still images, the image information data is converted into image information data related to dynamic images. Each of the information coding scheme converting units $48_1$ and $48_2$ has a filtering function.

The information combining unit 50 combines or multiplexes the voice information data and the image information data respectively supplied from the information coding scheme converting units $48_1$ and $48_2$ and having the information coding scheme of the videophone communication device 46 into a single multiplexed or combined information data having the information coding scheme of the videophone communication device 46, and supplies the multiplexed or combined information data to the communication protocol unit 54. The communication protocol unit 54 sends the multiplexed or combined information data (or videophone information data) from the information combining unit 50 and having the information coding scheme of the videophone communication device 46 to the videophone communication device 46 via the network 45.

On the other hand, the videophone communication device 46 supplies the videophone information data received from the videophone communication device 46 via the network 45 and having the information coding scheme of the videophone communication device 46 to an information separating unit 52 of the virtual communication device function unit 43. The information separating unit 52 separates the videophone information data in which the voice information data and the image information data are combined or multiplexed, into the voice information data and the image information data. The separated voice information data and image information data from the information separating unit 52 are respectively supplied to the information coding scheme converting units $48_1$ and $48_2$. Hence, the information coding scheme converting unit $48_1$ converts the voice information data into voice information data having the information coding scheme of the cellular phone 40, and supplies the converted voice information data to the communication protocol unit $47_1$. The information coding scheme converting unit $48_2$ converts the image information data into image information data having the information coding scheme of the PDA 41, and supplies the converted image information data to the communication protocol unit $47_2$.

The device management function unit 44 of the virtual communication device configuring apparatus 42 includes a device management function unit 56. Management information indicating communication attributes of the cellular phone 40, the PDA 41 and the videophone communication device 46 which are respectively connected to the communication protocol units $\mathbf{47}_1$, $\mathbf{47}_2$ and 54, such as the capabilities and functionalities which include the kind of information data processed, the functions, the human interface capabilities, the communication capabilities and the communication status (indicating whether or not to permit a requested communication), is notified from the communication protocol units $\mathbf{47}_1$, $\mathbf{47}_N$ and 54 of the virtual communication device function unit 43 to the device management function unit 56. The device management function unit 56 supplies control signals to and controls operations of the communication protocol units $\mathbf{47}_1$, $\mathbf{47}_N$ and 54, the information coding scheme converting units $\mathbf{48}_1$ and $\mathbf{48}_2$, the information combining unit 50 and the information separating unit 52, depending on the kinds of information data input and output by the cellular phone 40, the PDA 41 and the videophone communication device 46.

When the videophone communication device 46 of the user B initiates a call addressed to one of the cellular phone 40, the PDA 41 and the like of the user A, the device management function unit 44 compares the capabilities of the communicatable one of the cellular phone 40, the PDA 41 and the like of the user A, based on the human interface capability and the communication capability required by the videophone communication device 46, and judges which of the cellular phone 40, the PDA 41 and the like can accept the call from the videophone communication device 46. Of the cellular phone 40, the PDA 41 and the like (that is, communication devices) usable by the user A, selected ones of the communication devices which can accept the call are virtually combined (or integrated) into a single virtual communication device by the virtual communication device function unit 43. Hence, a communication can be made between this virtual communication device and the videophone communication device 46 usable by the user B.

Figure 4:
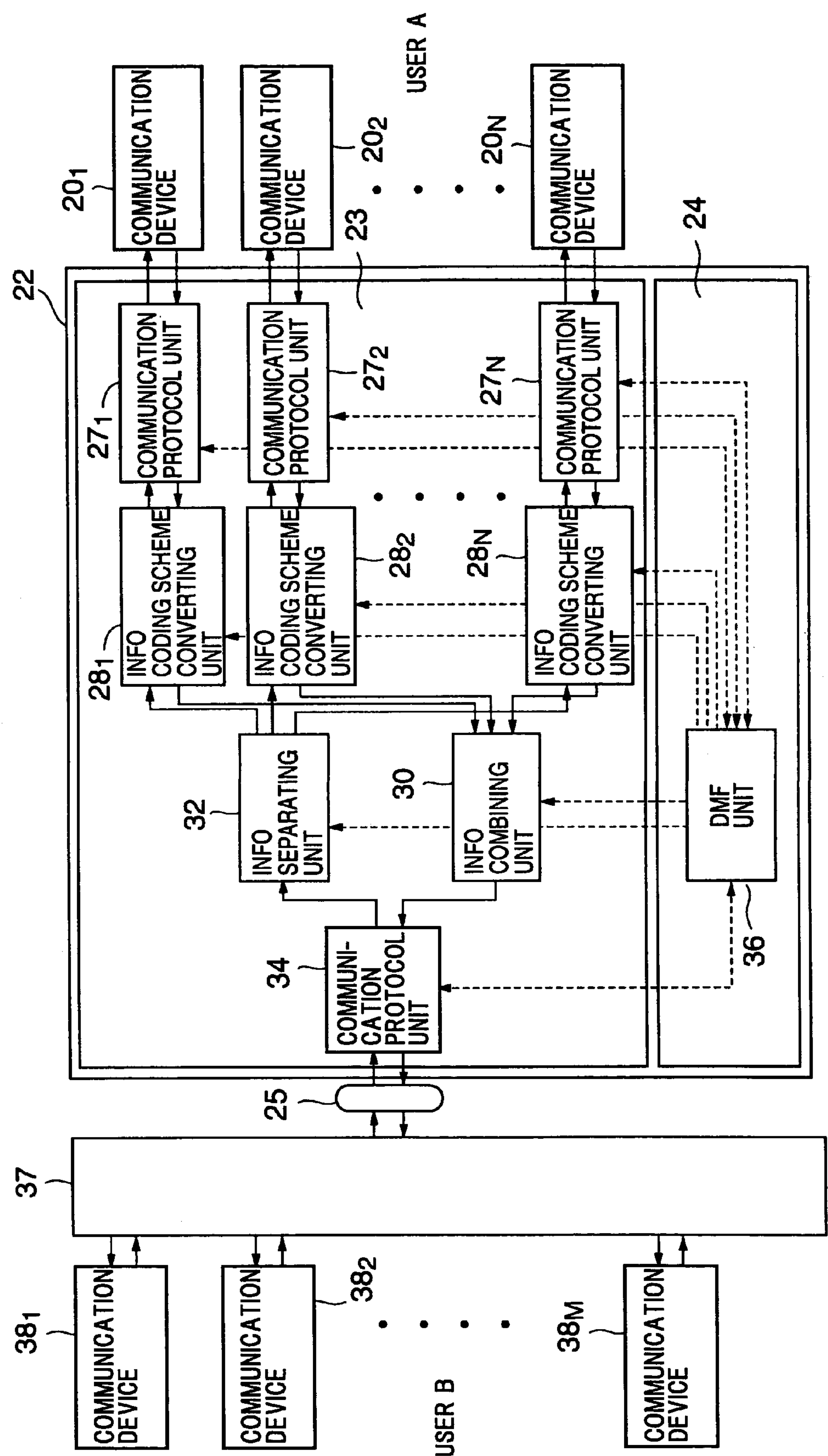
FIG. 4 is a block diagram showing a communication system including a third embodiment of the virtual communication device configuring apparatus according to the present invention.

FIG. 4 is a block diagram showing a communication system including a third embodiment of the virtual communication device configuring apparatus according to the present invention. In FIG. 4, those parts which are the same as those corresponding parts in FIG. 2 are designated by the same reference numerals, and a description thereof will be omitted. In FIG. 4, a virtual communication device configuring apparatus (or virtual terminal configuring apparatus) 37 is connected to the network 25 in place of the communication device 26 shown in FIG. 2. The structure and operations of the virtual communication device configuring apparatus 37 are the same as those of the virtual communication device configuring apparatus 22. Communication devices $\mathbf{38}_1$ through $\mathbf{38}_M$ which are usable by the user B are connected to the virtual communication device configuring apparatus 37.

According to the structure shown in FIG. 4, the communication devices $\mathbf{20}_1$ through $\mathbf{20}_N$ usable by the user A are virtually combined (or integrated) into a single virtual communication device by means of the virtual communication device configuring apparatus 22, and the communication devices $\mathbf{38}_1$ through $\mathbf{38}_M$ usable by the user B are virtually combined (or integrated) into a single virtual communication device by means of the virtual communication device configuring apparatus 37. Hence, a communication can be made between the virtual communication devices of the users A and B.

Figure 5:
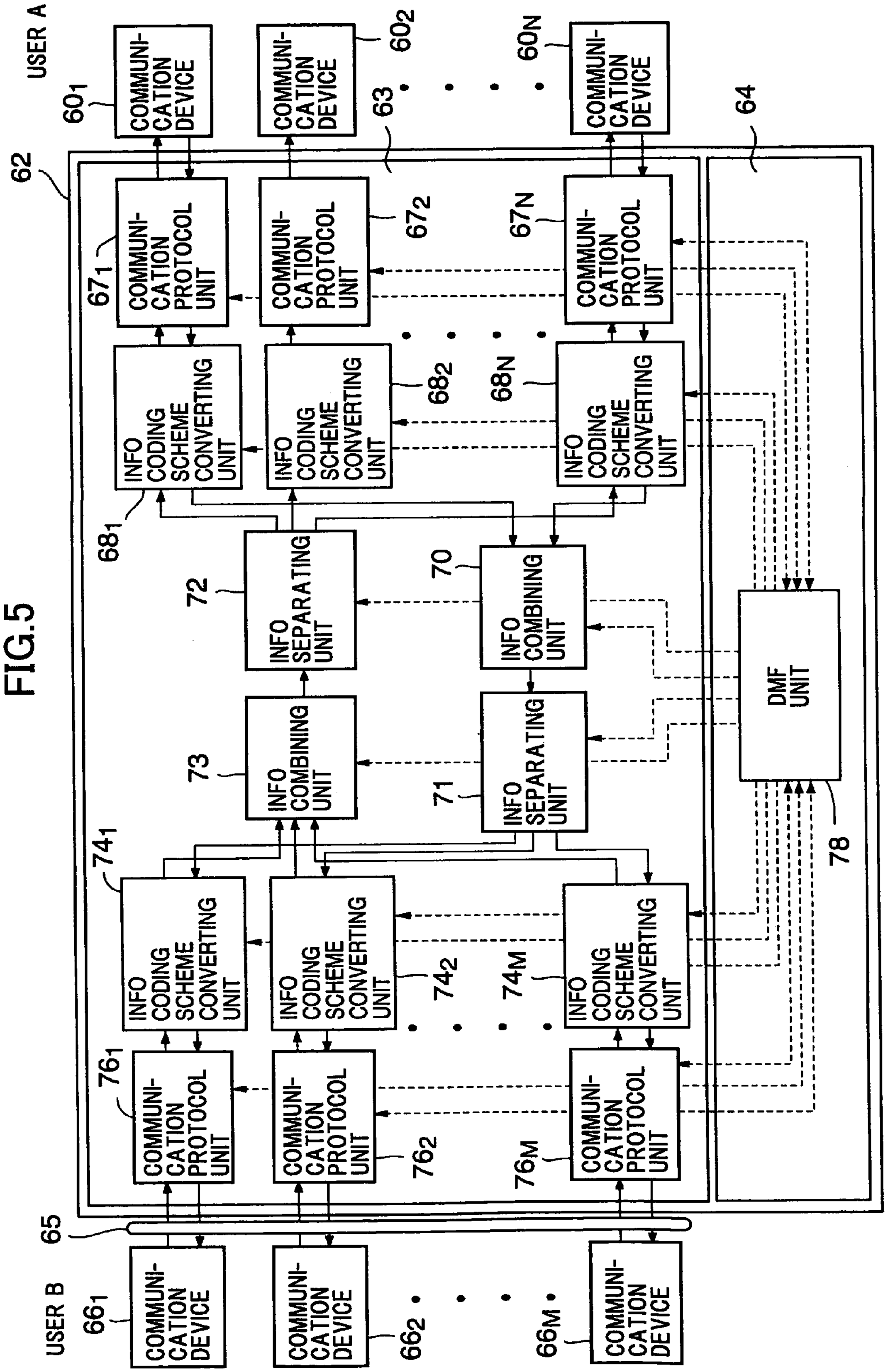
FIG. 5 is a block diagram showing a communication system including a fourth embodiment of the virtual communication device configuring apparatus according to the present invention.

FIG. 5 is a block diagram showing a communication system including a fourth embodiment of the virtual communication device configuring apparatus according to the present invention. In FIG. 5, communication devices $\mathbf{60}_1$ through $\mathbf{6}_N$ usable by the user A are connected to a virtual communication device configuring apparatus (or virtual terminal configuring apparatus) 62. The virtual communication device configuring apparatus 62 is connected, via the network 25, to communication devices $\mathbf{66}_1$ through $\mathbf{66}_M$ usable by the user B. The communication devices $\mathbf{60}_1$ through $\mathbf{60}_N$ and $\mathbf{66}_1$ through $\mathbf{66}_M$ are capable of inputting and outputting various kinds of information data, such as voice, image, character and numerical value information.

The virtual communication device configuring apparatus 62 includes a virtual communication device function unit (or virtual terminal function unit) 63 and a device management function unit 64. The communication devices $\mathbf{60}_1$ through $\mathbf{60}_N$ are respectively connected to associated communication protocol units $\mathbf{67}_1$ through $\mathbf{67}_N$ of the virtual communication device function unit 63, and two-way communications can be made between the communication devices $\mathbf{60}_1$ through $\mathbf{60}_N$ and corresponding communication protocol units $\mathbf{67}_1$ through $\mathbf{67}_N$. The communication devices $\mathbf{66}_1$ through $\mathbf{66}_M$ are respectively connected to associated communication protocol units $\mathbf{76}_1$ through $\mathbf{76}_M$ of the virtual communication device function unit 63, and two-way communications can be made between the communication devices $\mathbf{66}_1$ through $\mathbf{66}_M$ and corresponding communication protocol units $\mathbf{76}_1$ through $\mathbf{76}_M$. The communication protocol units $\mathbf{67}_1$ through $\mathbf{67}_N$ form a virtual terminal interface and/or a signal interface, and the communication protocol units $\mathbf{76}_1$ through $\mathbf{76}_M$ forms a virtual terminal interface and/or a signal interface.

The communication protocol units $\mathbf{67}_1$ through $\mathbf{67}_N$ are connected to corresponding information coding scheme converting units $\mathbf{68}_1$ through $\mathbf{68}_N$. The information coding scheme converting units $\mathbf{68}_1$ through $\mathbf{68}_N$ respectively convert information coding schemes employed by information data supplied from the communication protocol units $\mathbf{67}_1$ through $\mathbf{67}_N$ into a common information coding scheme, and supply the information data employing the common information coding scheme to an information combining unit 70. Each of the information coding scheme converting units $\mathbf{68}_1$ through $\mathbf{68}_N$ has a filtering function described above.

The information combining unit 70 combines the information data which are supplied from the information coding scheme converting units $\mathbf{68}_1$ through $\mathbf{68}_N$ and have been converted to employ the common information coding scheme into a single combined or multiplexed information data. The combined or multiplexed information data from the information combining unit 70 is supplied to an information separating unit 71. Various kinds of information data, such as voice, image, character and numerical value information are combined or multiplexed in the combined or multiplexed information data. The information separating unit 71 separates the combined or multiplexed information data into the kinds of information data, and supplies the kinds of information data to corresponding information coding scheme converting units $\mathbf{74}_1$ through $\mathbf{74}_M$. The information coding scheme converting units $\mathbf{74}_1$ through $\mathbf{74}_M$ convert the information data employing the common information coding scheme into information data employing the information coding schemes employed by corresponding communication protocol units $\mathbf{76}_1$ through $\mathbf{76}_M$, and supply the converted information data to the corresponding communication protocol units $\mathbf{76}_1$ through $\mathbf{76}_M$. Each of the information coding scheme converting units $\mathbf{74}_1$ through $\mathbf{74}_M$ has a filtering function described above. The communication protocol units $76_1$ through $76_M$ send the information data employing the respective information coding schemes to the corresponding communication devices $66_1$ through $66_M$.

The communication protocol units $76_1$ through $76_M$ supply various kinds of information data, such as voice, image, character and numerical value information received from the communication devices $66_1$ through $66_M$ to the corresponding information coding scheme converting units $74_1$ through $74_M$. The information coding scheme converting units $74_1$ through $74_M$ respectively convert the information coding schemes employed by information data supplied from the communication protocol units $76_1$ through $76_M$ into a common information coding scheme, and supply the information data employing the common information coding scheme to an information combining unit 73.

The information combining unit 73 combines the information data which are supplied from the information coding scheme converting units $74_1$ through $74_M$ and have been converted to employ the common information coding scheme into a single combined or multiplexed information data. The combined or multiplexed information data from the information combining unit 73 is supplied to an information separating unit 72. Various kinds of information data, such as voice, image, character and numerical value information are combined or multiplexed in the combined or multiplexed information data. The information separating unit 72 separates the combined or multiplexed information data into the kinds of information data, and supplies the kinds of information data to the corresponding information coding scheme converting units $68_1$ through $68_N$. The information coding scheme converting units $68_1$ through $68_N$ convert the information data employing the common information coding scheme into information data employing the information coding schemes employed by corresponding communication protocol units $67_1$ through $67_N$, and supply the converted information data to the corresponding communication protocol units $67_1$ through $67_N$. The communication protocol units $67_1$ through $67_N$ send the information data employing the respective information coding schemes to the corresponding communication devices $60_1$ through $60_N$.

The device management function unit 64 of the virtual communication device configuring apparatus 62 includes a device management function unit 78. Management information indicating communication attributes of the communication devices $60_1$ through $60_N$ and $66_1$ through $66_M$ which are respectively connected to the communication protocol units $67_1$ through $67_N$ and $76_1$ through $76_M$, such as the capabilities and functionalities which include the kind of information data processed, the functions, the human interface capabilities, the communication capabilities and the communication status (indicating whether or not to permit a requested communication), is notified from the communication protocol units $67_1$ through $67_N$ and $76_1$ through $76_M$ of the virtual communication device function unit 63 to the device management function unit 78. The device management function unit 78 supplies control signals to and controls operations of the communication protocol units $67_1$ through $67_N$ and $76_1$ through $76_M$, the information coding scheme converting units $68_1$ through $68_N$ and $74_1$ through $74_M$, the information combining units 70 and 73, and the information separating units 71 and 72, depending on the kinds of information data input and output by the communication devices $60_1$ through $60_N$ and $66_1$ through $66_M$.

Accordingly, the communication devices $60_1$ through $60_N$ usable by the user A are virtually combined (or integrated) into a single virtual communication device by the virtual communication device function unit 62. Similarly, the communication devices $66_1$ through $66_M$ usable by the user B are virtually combined (or integrated) into a single virtual communication device by the virtual communication device function unit 62. As a result, a communication can be made between the virtual communication device of the user A and the virtual communication device of the user B.

The functions of the virtual communication device configuring apparatuses 22, 42 and 62 may be realized by software. Similarly, the functions of the virtual communication device function units 23, 43 and 63 may be realized by software. Furthermore, the functions of the device management function units 24, 44 and 64 may be realized by software. The virtual communication device function units 23, 43 and 63 may be formed as devices separate from the corresponding device management function units 24, 44 and 64. For example, the virtual communication device function units 23, 43 and 63 may be set up at locations remote from the locations of the corresponding device management function units 24, 44 and 64.

In the embodiments described above, the virtual communication device configuring apparatus which virtually combines (or integrates) the communication devices is set up on the user side and connected to a single network. However, the present invention is not limited to such a setup, as will be described in conjunction with the following embodiments.

Figure 6:
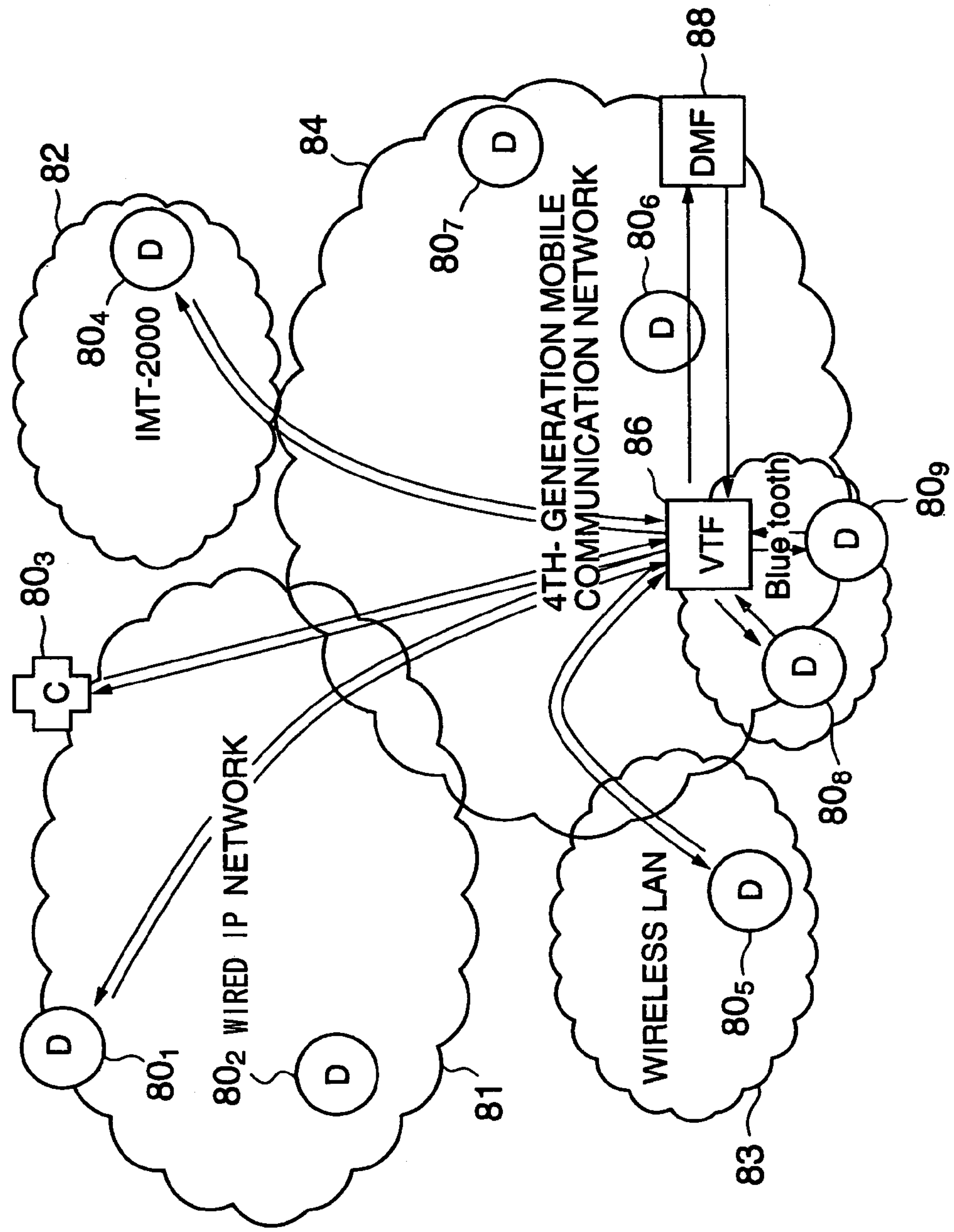
FIG. 6 is a diagram showing a network structure of a communication system including the virtual communication device configuring apparatus according to the present invention.

FIG. 6 is a diagram showing a network structure of a communication system including the virtual communication device configuring apparatus according to the present invention. Any of the first through fourth embodiments of the virtual communication device configuring apparatus may be used as the virtual communication device configuring apparatus shown in FIG. 6. In FIG. 6, communication devices $80_1$ through $80_3$ are connected to a wired IP network 81. A communication device $80_4$ is connected to an IMT-2000 which is a next-generation mobile communication system. A communication device $80_5$ is connected to a wireless LAN 83. Communication devices $80_6$ and $80_7$ are connected to a fourth-generation mobile communication system 84.

Figure 7:
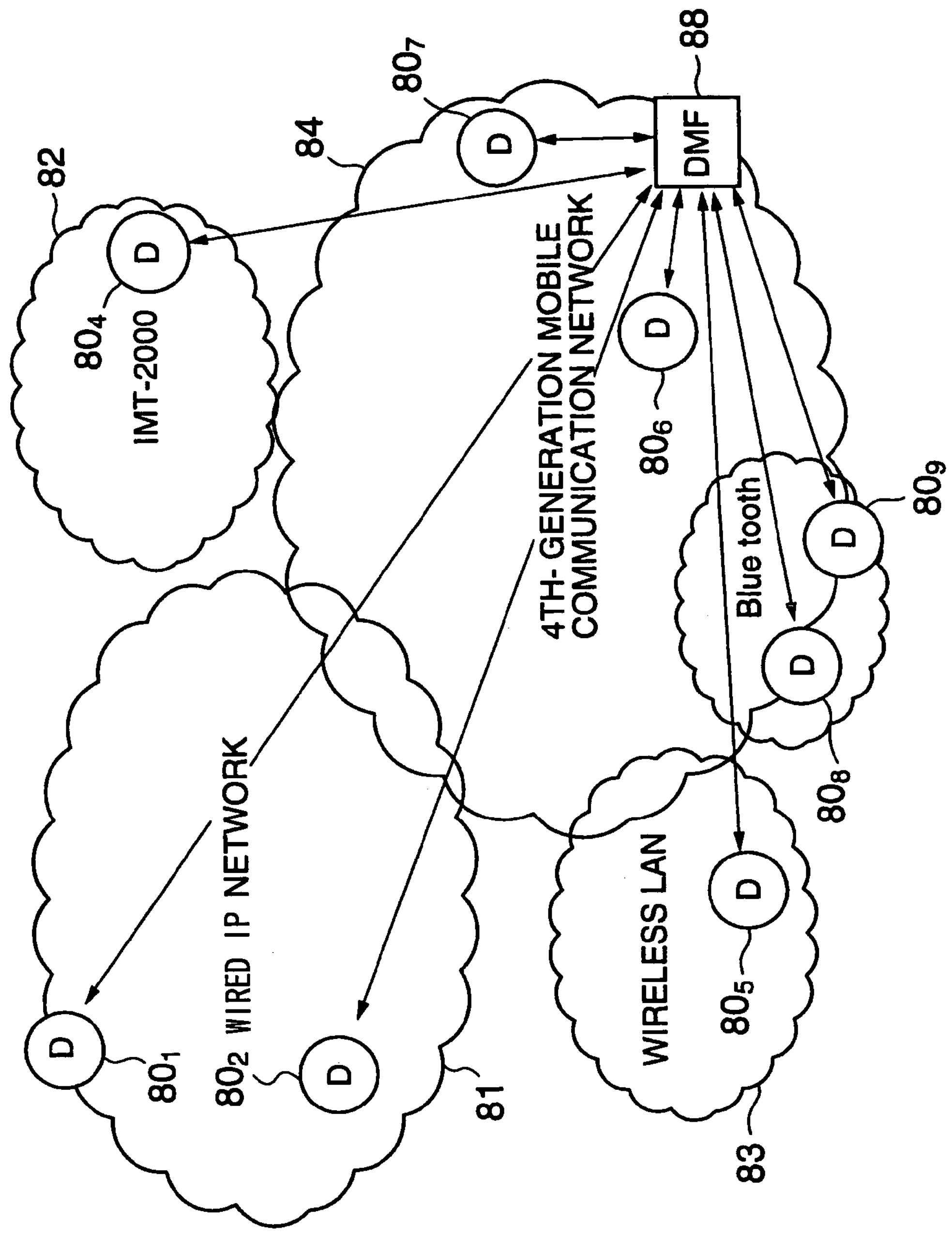
FIG. 7 is a diagram for explaining an operation of a device management function unit which acknowledges kinds of information processed by communication devices.
Figure 8:
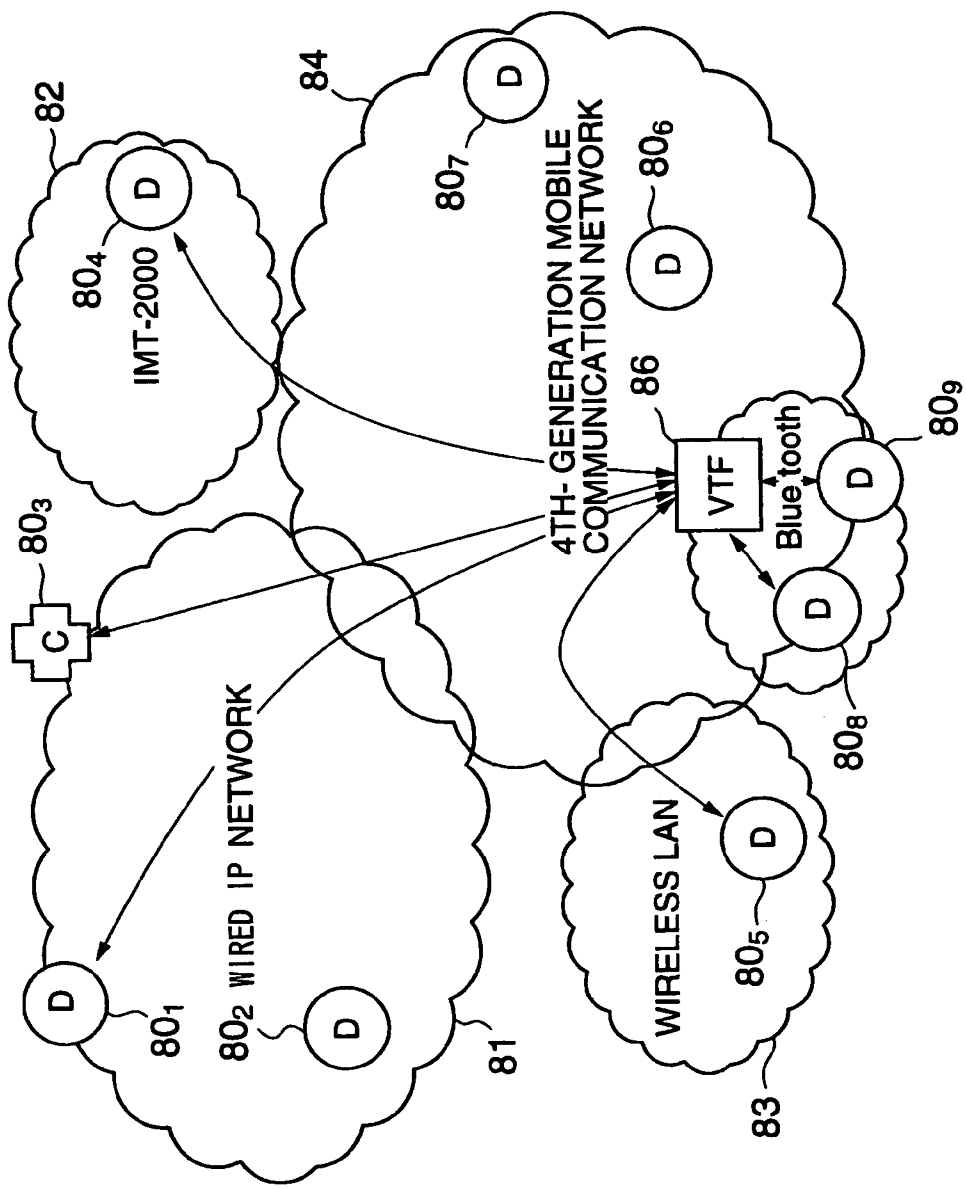
FIG. 8 is a diagram for explaining the device management function unit which combines communication devices coupled to a network.

A virtual terminal function (VTF) unit (or virtual communication device function unit) 86 and a device management function (DMF) unit 88, which form a virtual communication device configuring apparatus, are connected to the fourth-generation mobile communication system 84 and are thus connected to each other. Communication devices $80_8$ and $80_9$ are connected to the VTF unit 86 by a Bluetooth (or wireless communication interface). In FIG. 6 and FIGS. 7 and 8 which will be described later, the communication devices $80_1$ through $80_9$ are denoted by a reference character D.

The VTF unit 86 may be formed by any of the virtual communication device function units 23, 43 and 63 described above in conjunction with FIGS. 2, 4 and 5. The DMF unit 88 may be formed by any of the device management function units 24, 44 and 64 described above in conjunction with FIGS. 2 through 5.

Each of the networks 25, 45 and 65 shown in FIGS. 2 through 5 corresponds to at least a portion of an entire network system which is formed by the networks 81 through 84 shown in FIG. 6. The virtual communication device function units 23, 43 and 63 shown in FIGS. 2 through 5 may be provided at any location within the entire network system shown in FIG. 6 as the VTF unit 86. In addition, the device management function units 24, 44 and 64 shown in FIGS. 2 through 5 may be provided at any location within the entire network system shown in FIG. 6 as the DMF unit 88.

In FIG. 6, the VTF unit 86 and the DMF unit 88 are set up at separate locations. Alternatively, the DMF unit 88 may be integrated within the VTF unit 86 so that the VTF unit 86 and the DMF unit 88 may be provided at the same location as a single unit.

The functions of the VTF unit 86 and the DMF unit 88 may be realized by software.

FIG. 7 is a diagram for explaining an operation of the DMF unit which acknowledges kinds of information processed by communication devices. In FIG. 7, those parts which are the same as those corresponding parts in FIG. 6 are designated by the same reference numerals, and a description thereof will be omitted.

In FIG. 7, the DMF unit 88 communicates with the communication devices $\mathbf{80}_1$ through $\mathbf{80}_9$, and recognizes the notified management information indicating the communication attributes of the communication devices $\mathbf{80}_1$ through $\mathbf{80}_9$, such as the capabilities and functionalities which include the kind of information data processed, the functions, the human interface capabilities, the communication capabilities and the communication status (indicating whether or not to permit a requested communication). Alternatively, the DMF unit 88 may access the communication devices $\mathbf{80}_1$ through $\mathbf{80}_9$, and collect the management information indicating the communication attributes of the communication devices $\mathbf{80}_1$ through $\mathbf{80}_9$, such as the capabilities and functionalities which include the kind of information data processed, the functions, the human interface capabilities, the communication capabilities and the communication status.

FIG. 8 is a diagram for explaining the DMF unit which integrates communication devices coupled to the network. In FIG. 8, those parts which are the same as those corresponding parts in FIG. 6 are designated by the same reference numerals, and a description thereof will be omitted.

In FIG. 8, the VTF unit 86 obtains a control signal from the DMF unit 88 via the fourth-generation mobile communication network 84. Hence, the communication devices $\mathbf{80}_1$, $\mathbf{80}_4$, $\mathbf{80}_5$, $\mathbf{80}_8$ and $\mathbf{80}_9$ usable by the user A are virtually combined (or integrated) into a single virtual communication device by the VTF unit 86, and a communication can be made between the virtual communication device of the user A and the communication device $\mathbf{80}_3$ usable by the user B.

Each of the communication devices $\mathbf{80}_1$ through $\mathbf{80}_9$ has at least one function selected from a group consisting of a voice (or audio) input function, an image input function, a character input function, a numerical value input function such as that of a sensor, a voice (or audio) output function, an image output function, a character output function, a memory function, and an information converting function such as that of an audio codec. For example, the communication device $\mathbf{80}_3$ of the user B shown in FIG. 8 may be a videophone communication device, and the communication device $\mathbf{80}_1$ of the user A may be a video camera which is installed at a street corner. The communication device $\mathbf{80}_4$ may be a cellular phone, and the communication device $\mathbf{80}_5$ may be a large-size display. The communication device $\mathbf{80}_8$ may be a PDA, and the communication device $\mathbf{80}_9$ may be a hard disk drive (HDD).

When the relative positions of the VTF unit 86 and the DMF unit 88 are taken into consideration, the communication between the VTF unit 86 and the DMF unit 88 becomes a communication between softwares if the VTF unit 86 and the DMF unit 88 are provided within a single server apparatus. On the other hand, if the VTF unit 86 and the DMF unit 88 are provided separately within mutually different server apparatuses, the communication between the VTF unit 86 and the DMF unit 88 is made via one or a plurality of networks which are linked.

Moreover, when the relative positions of the VTF unit 86 and the DMF unit 88 are taken into consideration, the VTF unit 86 and the DMF unit 88 may be provided in a device or apparatus not owned by the user or, provided in a device or apparatus owned by the user. In the former case, the VTF unit 86 and the DMF unit 88 may be provided in a server apparatus which is connected to a plurality of kinds of networks in which communication devices which may form a virtual communication device exist. On the other hand, in the latter case, the VTF unit 86 and the DMF unit 88 may be provided in a communication device that is connectable to a plurality of kinds of networks, for example.

Figure 9:
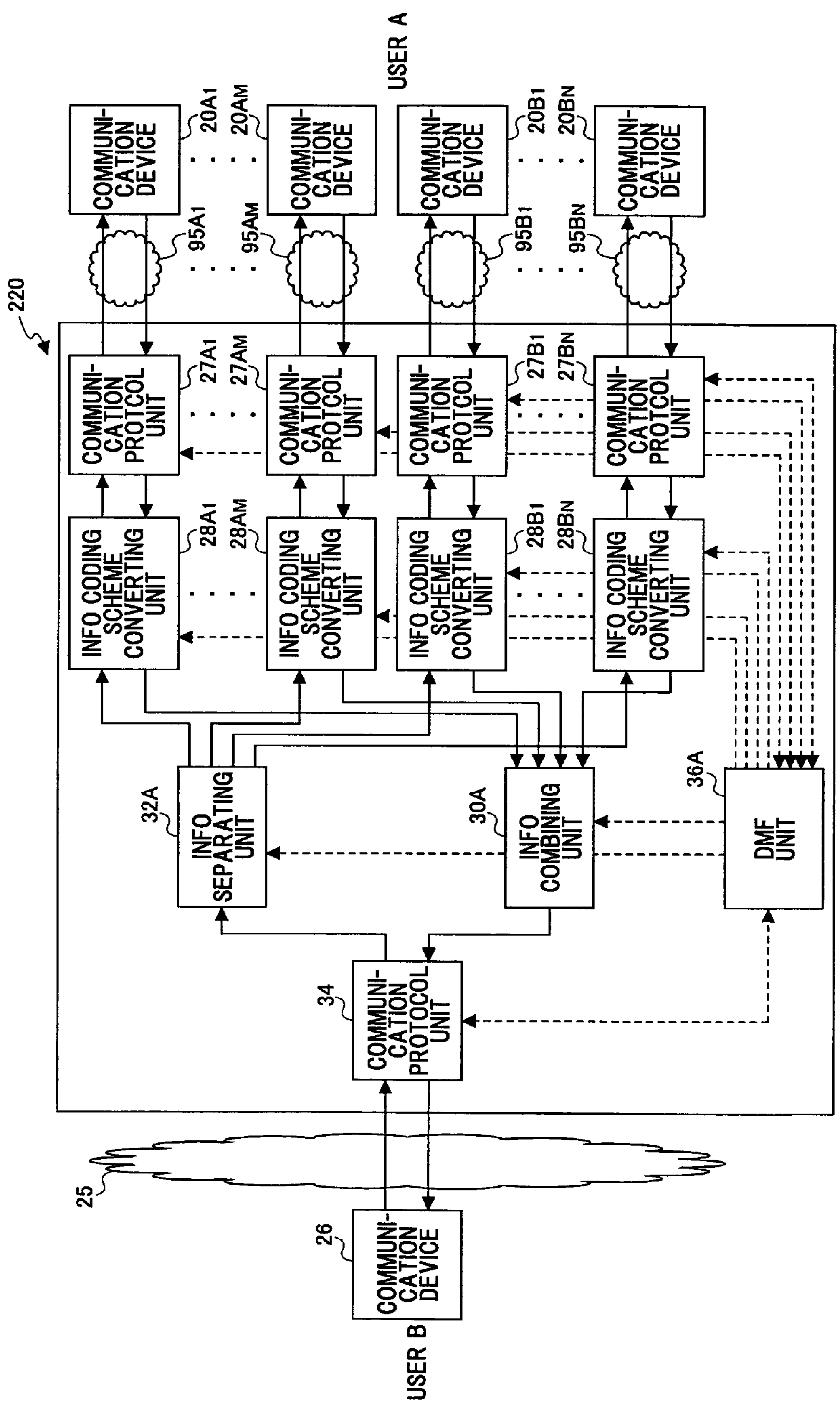
FIG. 9 is a block diagram showing a communication system including a fifth embodiment of the virtual communication device configuring apparatus according to the present invention.

FIG. 9 is a block diagram showing a communication system including a fifth embodiment of the virtual communication device configuring apparatus according to the present invention. In FIG. 9, those parts which are basically the same as those corresponding parts in FIG. 2 are designated by the same reference numerals, and a description thereof will be omitted. In this embodiment, a virtual communication device configuring apparatus (or virtual terminal configuring apparatus) 220 may be portable by the user A.

The virtual communication device configuring apparatus 220 includes communication protocol units $\mathbf{27}A_1$ through $\mathbf{27}A_M$ and information coding scheme converting units $\mathbf{28}A_1$ through $\mathbf{28}A_M$, which are provided with respect to networks $\mathbf{95}A_1$ through $\mathbf{95}A_M$, and communication protocol units $\mathbf{27}B_1$ through $\mathbf{27}B_N$ and information coding scheme converting units $\mathbf{28}B_1$ through $\mathbf{28}B_N$, which are provided with respect to networks $\mathbf{95}B_1$ through $\mathbf{95}B_N$. The communication protocol units $\mathbf{27}A_1$ through $\mathbf{27}A_M$ and $\mathbf{27}B_1$ through $\mathbf{27}B_N$ form a virtual terminal interface, and may be constructed similarly to the communication protocol units $\mathbf{27}_1$ through $\mathbf{27}_N$ of the first embodiment. The information coding scheme converting units $\mathbf{28}A_1$ through $\mathbf{28}A_M$ and the information coding scheme converting units $\mathbf{28}B_1$ through $\mathbf{28}B_N$ may be constructed similarly to the information coding scheme converting units $\mathbf{28}_1$ through $\mathbf{28}_N$ of the first embodiment. The communication protocol units $\mathbf{27}A_1$ through $\mathbf{27}A_M$ are connectable to portable communication devices $\mathbf{20}A_1$ through $\mathbf{20}A_M$ which are usable by the user A, via the corresponding networks $\mathbf{95}A_1$ through $\mathbf{95}A_M$. The communication protocol units $\mathbf{27}B_1$ through $\mathbf{27}B_N$ are connectable to communication devices $\mathbf{20}B_1$ through $\mathbf{20}B_N$ which are usable by the user A, via the corresponding networks $\mathbf{95}B_1$ through $\mathbf{95}B_N$. The communication devices $\mathbf{20}A_1$ through $\mathbf{20}A_M$ are carried by the user A in a state usable by the user A. On the other hand, the communication devices $\mathbf{20}B_1$ through $\mathbf{20}B_N$ are located in a periphery or surrounding of the user A, that is, in a neighborhood or environment of the user A, in a state usable by the user A. For this reason, the communication devices $\mathbf{20}B_1$ through $\mathbf{20}B_N$ will be referred to as "peripheral communication devices" in the following description for the sake of convenience.

In other words, the virtual communication device configuring apparatus 220 may be coupled to at least one of the portable communication devices $\mathbf{20}A_1$ through $\mathbf{20}A_M$ which are usable by the user A via the corresponding networks $\mathbf{95}A_1$ through $\mathbf{95}A_M$, and to at least one of the peripheral communication devices $\mathbf{20}B_1$ through $\mathbf{20}B_N$ which are usable by the user A via the corresponding networks $\mathbf{95}B_1$ through $\mathbf{95}B_N$.

The portable communication devices $20A_1$ through $20A_M$ which are usable by the user A are not fixed and may change. For example, the portable communication devices $20A_1$ through $20A_M$ may change depending on the intention of the user A, such as when the user A starts to use a new portable communication device or discontinues the use of a portable communication device.

The peripheral communication devices $20B_1$ through $20B_N$ which are usable by the user A are not fixed and may change. For example, the peripheral communication devices $20B_1$ through $20B_N$ may change depending on the location of the user A. In other words, the peripheral communication devices $20B_1$ through $20B_N$ may include a television set, a video cassette recorder and the like when the user A is at home, include a display and the like owned by another user when the user A is outside, and include a computer and the like owned by a company when the user A is at the company office.

In other words, the number and/or the communication attribute of the portable communication devices $20A_1$ through $20A_M$ and the peripheral communication devices $20B_1$ through $20B_N$ may change. Usually, it is more difficult to detect the peripheral communication devices $20B_1$ through $20B_N$ which are located in the periphery or surrounding of the user A, than to detect the portable communication devices $20A_1$ through $20A_M$ which are carried by the user A.

The virtual communication device configuring apparatus 220 is connectable to the communication device 26 via the network 25, similarly to the first embodiment shown in FIG. 2. The communication device 26 is usable by the user B.

Each of the networks 25, $95A_1$ through $95A_M$ and $95B_1$ through $95B_N$ may be made up of one or more networks such as wired networks, optical networks wireless networks, and an arbitrarily combination of such networks. In other words, the networks which may be used to form the networks 25, $95A_1$ through $95A_M$ and $95B_1$ through $95B_N$ include wireless networks such as a cellular network, a wireless LAN and a Bluetooth, and wired networks such as an Ethernet, USB and IEEE1394. The networks are of course not limited to the LAN, and may include a Personal Area Network (PAN), a Wide Area Network (WAN) and the like.

The virtual communication device configuring apparatus 220 virtually combines (or integrates) selected ones of the portable communication devices $20A_1$ through $20A_M$ and the peripheral communication devices $20B_1$ through $20B_N$ into a single virtual communication device. This single virtual communication device of the user A can communicate with the communication device 26 of the user B via the network 25.

In this embodiment, each of the communication protocol units $27A_1$ through $27A_M$ and $27B_1$ through $27B_N$ may carry out the following steps (or functions) ST1 and ST2, and the communication protocol unit 34 may carry out the following steps (or functions) ST3 and ST4.

The step ST1 detects the existence, communication capability, availability (or permission of use), kind of communication protocol employed, kind of information coding scheme employed, human interface capability and the like of the portable communication devices $20A_1$ through $20A_M$ and the peripheral communication devices $20B_1$ through $20B_N$ which are usable by the user A. The step ST2 makes communications with the portable communication devices $20A_1$ through $20A_M$ and the peripheral communication devices $20B_1$ through $20B_N$ using the corresponding communication protocols.

On the other hand, the step ST3 detects the kind of communication protocol employed, kind of information coding scheme employed, human interface capability and the like of the communication device 26 usable by the user B. The step S4 makes a communication with the communication device 26 using the corresponding communication protocol.

In the step ST1, the existence of the portable communication devices $20A_1$ through $20A_M$ and the peripheral communication devices $20B_1$ through $20B_N$ may be detected by a detection procedure during the communication protocol procedure with the corresponding communication device. For example, in the case of the communication device connected by a wireless LAN such as the IEEE802.11, the existence of the communication device may be detected by exchanging a Beacon Signal or an Association Signal.

In the step ST1, the communication capability of the portable communication devices $20A_1$ through $20A_M$ and the peripheral communication devices $20B_1$ through $20B_N$ may be detected by a connection confirmation procedure during the communication protocol procedure with the corresponding communication device. For example, in the case of the communication device connected by an IP network such as the Internet Protocol Version 6 (IPv6), the communication capability of the communication device may be detected based on a Neighbor Solicitation Signal or a Neighbor Advertisement Signal of the Neighbor Discovery Protocol.

In the step ST1, the availability of the portable communication devices $20A_1$ through $20A_M$ and the peripheral communication devices $20B_1$ through $20B_N$ to the user A may be detected by a communication permission confirmation procedure during the communication protocol procedure with the corresponding communication device. For example, in the case of the communication device connected by the IP network such as the IPv6, the availability of the communication device may be detected based on a service permission judging procedure which involves authentication such as Radius and Diameter.

In the step ST1, the kind of communication protocol employed by the portable communication devices $20A_1$ through $20A_M$ and the peripheral communication devices $20B_1$ through $20B_N$ may be detected by judging the communication protocol with which the communication protocol unit is able to communicate with the corresponding communication device.

In the step ST1, the kind of information coding scheme employed by the portable communication devices $20A_1$ through $20A_M$ and the peripheral communication devices $20B_1$ through $20B_N$ may be detected by judging the information coding scheme of the information exchanged with the corresponding communication device during the communication protocol procedure. For example, in a case where the communication protocol unit communicates with the communication device according to a communication protocol such as the Real Time Protocol (RTP), it may be judged from the kind of information coding scheme of the RTP that the information data being communicated is image information in conformance with the MPEG4.

In the step ST1, the human interface capability of the portable communication devices $20A_1$ through $20A_M$ and the peripheral communication devices $20B_1$ through $20B_N$ may be detected by a device capability notification procedure during the communication protocol procedure with the corresponding communication device.

In this embodiment, the device management function unit 36A may carry out the following steps (or functions) ST11 through ST14.

The step ST11 manages the kind of communication protocol and the kind of information coding scheme employed by the communication device 26 of the user B, based on the information obtained from the communication protocol unit 34 which communicates with the communication device 26 via the network 26.

The step ST12 manages the kind of communication protocol and the kind of information coding scheme employed by and the human interface capability of the communicatable and available ones of the portable communication devices 20$A_1$ through 20$A_M$ and the peripheral communication devices 20$B_1$ through 20$B_N$ of the user A, based on the information obtained from the communication protocol units 27$A_1$ through 27$A_M$ and 27$B_1$ through 27$B_N$ which communicate with the portable communication devices 20$A_1$ through 20$A_M$ and the peripheral communication devices 20$B_1$ through 20$B_N$ via the corresponding networks 95$A_1$ through 95$A_M$ and 95$B_1$ through 95$B_N$.

The step ST13 judges whether or not a communication may be made between the communication device 26 of the user B and the communication devices available to the user A of the portable communication devices 20$A_1$ through 20$A_M$ and the peripheral communication devices 20$B_1$ through 20$B_N$.

The step ST14 notifies the information, including control signals, necessary to make the connection to enable the communication between the communication device 26 of the user B and the communication devices available to the user A, to an information separating unit 32A, an information combining unit 30A, the information coding scheme converting units 28$A_1$ through 28$A_M$ and 28$B_1$ through 28$B_N$, and the communication protocol units 34, 27$A_1$ through 27$A_M$ and 27$B_1$ through 27$B_N$.

For example, when a communication from the communication device 26 of the user B to the user A is requested, the device management function unit 36A obtains the kind of communication protocol and the kind of information coding scheme by carrying out the step ST11, and refers to the information related to the communication devices available to the user A and managed by the device management function unit 36A by carrying out the step ST12. Further, the device management function unit 36A forms a virtual communication device by the communication devices available to the user A and judges whether or not the virtual communication device is able to receive the communication from the communication device 26, by carrying out the step ST13. If the virtual communication device is able to receive the communication from the communication device 26, the device management function unit 36A notifies the necessary information to the information separating unit 32A, the information combining unit 30A, the information coding scheme converting units 28$A_1$ through 28$A_M$ and 28$B_1$ through 28$B_N$, and the communication protocol units 34, 27$A_1$ through 27$A_M$ and 27$B_1$ through 27$B_N$, by carrying out the step ST14.

For example, in a case where the number of portable communication devices 20$A_1$ through 20$A_M$ changes with time depending on the intention of the user A, the device management function unit 36A carries out the steps ST13 and ST14 after carrying out the step ST12 to add information related to a new portable communication device which is newly added for use by the user A and/or to delete the information related to the portable communication device which is no longer used by the user A. Similarly, in a case where the number of peripheral communication devices 20$B_1$ through 20$B_N$ changes with time depending on the location of the user A, the device management function unit 36A carries out the steps ST13 and ST14 after carrying out the step ST12 to add information related to a new peripheral communication device which newly appears (or exists) at the location for use by the user A and/or to delete the information related to the peripheral communication device which no longer appears (or exists) at the location for use by the user A. Therefore, by carrying out the steps ST11 through ST14, the communication devices forming the virtual communication device change depending on the intention and/or location of the user.

In this embodiment, the information separating unit 32A separates the information data received from the communication device 26 of the user B via the network 25 and the communication protocol unit 34 into the information data (or content parts) receivable by the communication devices of the user A forming the virtual communication device, based on the kind of information such as voice (or audio), sound, still image, dynamic image and the like. For example, if the communication device 26 sends dynamic image information with stereo sound and a first communication device of the user A is able to receive the dynamic image information and a second communication device of the user is able to receive the stereo sound information, the information separating unit 32A separates the dynamic image information with stereo sound into the dynamic image information and the stereo sound information.

In addition, if the device management function unit 36A notifies the information separating unit 32A that the communication devices forming the virtual communication device changed due to a change in the intention and/or location of the user A, the information separating unit 32A changes the method of separating the information data received from the communication device 26 of the user B to be sent to the communication devices of the user A. For example, in a case where the second communication device of the user A able to receive the stereo sound information in the above described case becomes no longer usable by the user A, but a third communication device and a fourth communication device of the user A become able to receive monophonic sound information, the information separating unit 32A separates the dynamic image information with stereo sound received from the communication device 26 of the user B into the dynamic image information receivable by the first communication device, right monophonic sound information receivable by the third communication device, and left monophonic sound information receivable by the fourth communication device.

In this embodiment, the information combining unit 30A combines the information data sent from the communication devices of the user A forming the virtual communication device into the information data to be received by the communication device 26 of the user B. For example, in a case where the first communication device of the user A sends dynamic image information and the second communication device of the user A sends stereo sound information, the information combining unit 30A combines the dynamic image information and the stereo sound information into dynamic image information with stereo sound to be received by the communication device 26 of the user B.

In addition, if the device management function unit 36A notifies the information combining unit 30A that the communication devices forming the virtual communication device changed due to a change in the intention and/or location of the user A, the information combining unit 30A changes the method of combining the information data received from the communication devices of the user A forming the virtual communication device to be sent to the communication device 26 of the user B. For example, in a case where the second communication device of the user A able to send the stereo sound information in the above described case becomes no longer usable by the user A, but a third communication device and a fourth communication device of the user A become able to send monophonic sound information, the information combining unit 30A combines the dynamic image information sent from the first communication device, right monophonic sound information sent from the third communication device, and left monophonic sound information sent from the fourth communication device into the dynamic image information with stereo sound to be received by the communication device 26 of the user B.

In this embodiment, the information coding scheme converting units 28$A_1$ through 28$A_M$ and 28$B_1$ through 28$B_N$ carry out the following steps (or functions) ST21 and ST22.

In the step ST21, the information coding scheme converting units 28$A_1$ through 28$A_M$ and 28$B_1$ through 28$B_N$ carry out a conversion between the information coding scheme employed by the information data supplied from the information separating unit 32A or supplied to the information combining unit 30A, and the information coding scheme receivable and transmittable by the communication protocols of the communication devices of the user A. In the step ST22, the information coding scheme converting units 28$A_1$ through 28$A_M$ and 28$B_1$ through 28$B_N$ carry out a filtering process with respect to the information data depending on the human interface capabilities of the communication devices of the user A.

For example, in a case where the communication device 26 of the user B encodes the dynamic image information according to the MPEG1 and the communication devices of the user A encode the dynamic image information according to the MPEG4, the corresponding information coding scheme converting units carry out the step ST21 to convert the dynamic image information from the communication device 26 of the user B encoded according to the MPEG1 and obtained via the communication protocol unit 34 by the separation made in the information separating unit 32A into dynamic image information in accordance with the MPEG4 to be sent to the communication devices of the user A, and to convert the dynamic image information from the communication devices of the user A encoded according to the MPEG4 and to be sent to the communication device 26 of the user B via the information combining unit 30A and the communication protocol unit 34.

In addition in a case where the human interface capability of the communication device 26 of the user B and the human interface capability of the communication devices of the user A differ, where the human interface capability includes a resolution (that is, a number of pixels forming one picture or frame), a frame rate (that is, a number of frames displayed per second) and the like, for example, the corresponding information coding scheme converting units carry out the step ST22 to suitable convert the resolution, the frame rate and the like of the dynamic image information by carrying out a filtering process with respect to the dynamic image information.

In addition, if the device management function unit 36A notifies the corresponding ones of the information coding scheme converting units 28$A_1$ through 28$A_M$ and 28$B_1$ through 28$B_N$ that the communication devices forming the virtual communication device changed due to a change in the intention and/or location of the user A, the corresponding information coding scheme converting units carry out the step ST21 to make conversions between the information coding scheme employed by the communication device 26 of the user B and the information coding scheme of the communication devices of the user A now forming the virtual communication device, and carry out the step ST22 to eliminate the difference between the human interface capability of the communication device 26 of the user B and the human interface capability of the communication devices of the user A now forming the virtual communication device by the filtering process described above.

Therefore, in this embodiment, the information data (or calling signal) from the communication device 26 of the user B, for example, may be at least one of a multi-media signal, a communication session and a video conference signal. In addition, when the information separating unit 32A separates the information data received from the communication device 26 of the user B, the information data may be separated into digital data representative of an audio signal and digital data representative of a video signal to be supplied to corresponding communication devices of the user A forming the virtual communication device.

Moreover, the communication attributes identified by the device management function unit 36A may be at least one of the capability and the functionality of the communication devices of the user A forming the virtual communication device. The communication attributes identified by the device management function unit 36A may include at least one of a coding scheme, a media content processing capability, an audio format processing capability, and a video format processing capability.

Further, the present invention is not limited to these embodiments, but various variations and modifications may be made without departing from the scope of the present invention.

What is claimed is:

1. An apparatus for configuring a virtual communication device that includes a plurality of communication devices accessible to the apparatus, said plurality of communication devices having variable communication attributes and/or being variable in number, said apparatus comprising:

a signal interface configured to receive information data from a calling communication device, said information data including at least a first content part and a second content part, said second content part containing information of a different media content than the first content part;

an information separating unit configured to separate the first and second content parts of the information data;

a device management function unit configured to identify the communication attributes of the plurality of communication devices accessible thereto and to identify which of the plurality of communication devices are capable of processing information corresponding to at least one of the first and second content parts, said communication attributes including capabilities or functionalities of the plurality of communication devices accessible to said device management function unit; and a virtual terminal interface configured to send information corresponding to the first content part to a first communication device identified by said device management function unit as being capable of processing the information of the first content part, and to send information corresponding to the second content part to a second communication device identified by said device management function unit as being capable of processing the information of the second content part, to thereby form the virtual communication device by at least the first and second communication devices.

2. The apparatus as claimed in claim 1, wherein said device management function unit is configured to detect a change in the communication attributes of the plurality of communication devices accessible thereto, and to send the information corresponding to the first and second content parts to selected ones of the plurality of communication devices based on the change detected thereby.

3. The apparatus as claimed in claim 1, wherein said signal interface is connectable to the calling communication device via one or a plurality of networks.

4. The apparatus as claimed in claim 1, wherein said virtual terminal interface is connectable to the plurality of communication devices via one or a plurality of networks.

5. The apparatus as claimed in claim 1, further comprising:

a converting unit configured to convert a signal coding scheme of the first content part into another signal coding scheme, said device management function unit being configured to identify the first communication device as being capable of processing data according to said another signal coding scheme.

6. The apparatus as claimed in claim 1, wherein the information data includes at least one of a multi-media signal, a communication session and a video conference signal.

7. The apparatus as claimed in claim 1, wherein the communication attributes include at least one of a coding scheme, media content processing capability, audio format processing capability, and video format processing capability.

8. The apparatus as claimed in claim 1, wherein the first content part includes digital data representative of an audio signal.

9. The apparatus as claimed in claim 1, wherein the second content part includes digital data representative of a video signal.

10. The apparatus as claimed in claim 1, wherein the first and second communication devices are located at mutually different locations.

11. An apparatus for configuring a virtual communication device that includes a plurality of communication devices accessible to the apparatus, said plurality of communication devices having variable communication attributes and/or being variable in number, said apparatus comprising:

signal interface means for receiving information data from a calling communication device, said information data including at least a first content part and a second content part, said second content part containing information of a different media content than the first content part;

information separating means for separating the first and second content parts of the information data;

management means for identifying the communication attributes of the plurality of communication devices accessible thereto and for identifying which of the plurality of communication devices are capable of processing information corresponding to at least one of the first and second content parts, said communication attributes including capabilities or functionalities of the plurality of communication devices accessible to said management means; and virtual terminal interface means for sending information corresponding to the first content part to a first communication device identified by said management means as being capable of processing the information of the first content part, and for sending information corresponding to the second content part to a second communication device identified by said management means as being capable of processing the information of the second content part, to thereby form the virtual communication device by at least the first and second communication devices.

12. An apparatus for configuring a virtual communication device that includes a plurality of communication devices accessible to the apparatus, said plurality of communication devices having variable communication attributes and/or being variable in number, said apparatus comprising:

a virtual terminal interface configured to receive information corresponding to a first content part from a first communication device of the plurality of communication devices and information corresponding to a second content part from a second communication device of the plurality of communication devices, said second content part containing information of a different media content than the first content part;

a device management function unit configured to identify the communication attributes of the plurality of communication devices accessible thereto, and to identify the first communication device as being capable of processing the information corresponding to the first content part and the second communication device as being capable of processing the information corresponding to the second content part, said communication attributes including capabilities or functionalities of the plurality of communication devices accessible to said device management function unit;

an information combing unit configured to combine the information corresponding to the first content part and the information corresponding to the second content part into information data which includes the first and second content parts; and a signal interface configured to send the information data to a calling communication device.

13. The apparatus as claimed in claim 12, wherein said device management function unit is configured to detect a change in the communication attributes of the plurality of communication devices accessible thereto, and to send to said information combining unit the information corresponding to the first and second content parts from selected ones of the plurality of communication devices based on the change detected thereby.

14. The apparatus as claimed in claim 12, further comprising:

a converting unit configured to convert a signal coding scheme of the first content part into another signal coding scheme.

15. The apparatus as claimed in claim 12, wherein the information data includes at least one of a multi-media signal, a communication session and a video conference signal.

16. The apparatus as claimed in claim 12, wherein the communication attributes include at least one of a coding scheme, media content processing capability, audio format processing capability, and video format processing capability.

17. The apparatus as claimed in claim 12, wherein the first and second communication devices are located at mutually different locations.

18. An apparatus for configuring a virtual communication device that includes a plurality of communication devices accessible to the apparatus, said plurality of communication devices having variable communication attributes and/or being variable in number, said apparatus comprising:

virtual terminal interface means for receiving information corresponding to a first content part from a first communication device of the plurality of communication devices and information corresponding to a second content part from a second communication device of the plurality of communication devices, said second content part containing information of a different media content than the first content part;

management means for identifying the communication attributes of the plurality of communication devices accessible thereto, and for identifying the first communication device as being capable of processing the information corresponding to the first content part and the second communication device as being capable of processing the information corresponding to the second content part, said communication attributes including capabilities or functionalities of the plurality of communication devices accessible to said management means;

information combing means for combining the information corresponding to the first content part and the information corresponding to the second content part into information data which includes the first and second content parts; and signal interface means for sending the information data to a calling communication device.

19. A method of configuring a virtual communication device that includes a plurality of communication devices having variable communication attributes and/or being variable in number, said method comprising the steps of:

(a) receiving information data from a calling communication device, said information data including at least a first content part and a second content part, said second content part containing information of a different media content than the first content part;

(b) separating the first and second content parts of the information data;

(c) identifying the communication attributes of the plurality of communication devices that are accessible and identifying which of the plurality of communication devices are capable of processing information corresponding to at least one of the first and second content parts, said communication attributes including capabilities or functionalities of the plurality of communication devices that are accessible; and (d) sending information corresponding to the first content part to a first communication device identified by said step (c) as being capable of processing the information of the first content part, and sending information corresponding to the second content part to a second communication device identified by said step (c) as being capable of processing the information of the second content part, to thereby form the virtual communication device by at least the first and second communication devices.

20. A method of configuring a virtual communication device that includes a plurality of communication devices having variable communication attributes and/or being variable in number, said method comprising the steps of:

(a) receiving information corresponding to a first content part from a first communication device of the plurality of communication devices and information corresponding to a second content part from a second communication device of the plurality of communication devices, said second content part containing information of a different media content than the first content part;

(b) identifying the communication attributes of the plurality of communication devices that are accessible, and identifying the first communication device as being capable of processing the information corresponding to the first content part and the second communication device as being capable of processing the information corresponding to the second content part, said communication attributes including capabilities or functionalities of the plurality of communication devices that are accessible;

(c) combining the information corresponding to the first content part and the information corresponding to the second content part into information data which includes the first and second content parts; and (d) sending the information data to a calling communication device.

* * * * *